(12) United States Patent
Shokite

(10) Patent No.: US 10,424,222 B2
(45) Date of Patent: Sep. 24, 2019

(54) DYNAMIC INTERFACE VIRTUALIZATION IN A NETWORKED COMPUTING ENVIRONMENT

(71) Applicant: HARTFORD FIRE INSURANCE COMPANY, Hartford, CT (US)

(72) Inventor: Thomas P. Shokite, Stratford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 786 days.

(21) Appl. No.: 14/924,169

(22) Filed: Oct. 27, 2015

(65) Prior Publication Data

US 2017/0116878 A1 Apr. 27, 2017

(51) Int. Cl.
*G09B 19/00* (2006.01)
*G09B 5/02* (2006.01)

(52) U.S. Cl.
CPC .......... *G09B 19/0053* (2013.01); *G09B 5/02* (2013.01)

(58) Field of Classification Search
CPC ... G06F 21/577; G06F 9/455; G09B 19/0053; G09B 5/02
See application file for complete search history.

(56) References Cited

U.S. PATENT DOCUMENTS

| | | | |
|---|---|---|---|
| 8,751,629 B2 | 6/2014 | White et al. | |
| 8,898,681 B1 | 11/2014 | Acheff et al. | |
| 2013/0152154 A1* | 6/2013 | Xiao | G06F 21/00 726/1 |
| 2014/0047551 A1* | 2/2014 | Nagasundaram | G06F 21/60 726/26 |
| 2014/0189643 A1 | 7/2014 | Raghunathan et al. | |
| 2014/0223418 A1 | 8/2014 | Michelsen et al. | |
| 2015/0051893 A1 | 2/2015 | Ratcliffe, III et al. | |
| 2015/0128295 A1 | 5/2015 | Gryb et al. | |

OTHER PUBLICATIONS

Wikipedia Contributors, "Service Virtualization", https://en.wikipedia.org/wiki/Service_virtualization, Oct. 6, 2015.

(Continued)

*Primary Examiner* — Eddy Saint-Vil
(74) *Attorney, Agent, or Firm* — Volpe and Koenig, P.C.

(57) ABSTRACT

Disclosed herein are processor-executable methods, computing systems, and related technologies for using a host server and service virtualization to mimic functions of a live enterprise service in order to provide a stable training environment for users of a data management system. Embodiments may include retrieving live data from the enterprise service. The live data may then be converted to virtualized data by deidentifying personal information, simplifying complex fields, and adjusting date fields, such that the virtualized data is an accurate representation of the live data formatting and is optimized for training purposes. The virtualized data may be processed using one or more virtualized resources on the host server, wherein the virtualized resources may correspond to functions of the enterprise service. A virtualized response may be generated in response to a user request to the host server.

19 Claims, 11 Drawing Sheets

(56) References Cited

OTHER PUBLICATIONS

Jason English, "Development and Test Cloud with Service Virtualization: Parts of a Complete Breakfast", https://www.skytap.com/blog/development-and-test-cloud-with-service-virtualization-parts-of-a-complete/, Jul. 29, 2014.

Michael Joseph, "5 Ways Service Virtualization can Speed and Improve Development", http://servicevirtualization.com/5-ways-service-virtualization-can-speed-and-improve-development/, Sep. 30, 2015.

* cited by examiner

DYNAMIC INTERFACE VIRTUALIZATION IN A NETWORKED COMPUTING ENVIRONMENT

FIELD OF INVENTION

The present invention is related to a system and method for using a host server to supplement an enterprise service in order to provide a stable training environment for users of a data management system.

BACKGROUND

Training new users on a live data management system may present a number of difficulties. A live system may be frequently updated and subject to heavy use, server re-boots, new code drops, and service outages that may make it difficult to provide a stable and consistent training environment. Application functionality and services that the system software calls may change due to software enhancements and bug fixes. These changes may make it difficult to keep training documentation current.

Service virtualization may be a way to create a stable training environment without the complications of interacting with a live system. Service virtualization is a way of emulating the behavior of specific components in heterogeneous component-based applications such as application program interface (API)-driven applications, cloud-based applications and service-oriented architectures. It can provide developers and users access to dependent system components that are needed to exercise an application under test (AUT), but are unavailable or difficult-to-access for development and testing purposes. With the behavior of the dependent components "virtualized," testing and development may proceed without accessing the actual live components.

SUMMARY

In an embodiment, a system for providing a virtualized training environment to mimic functions of an enterprise service is disclosed. The system may include: a communications interface; a memory coupled to the communications interface, the memory stores an electronic request processing application; and a processor in communication with the memory, the processor executes the electronic request processing application stored in the memory, the electronic request processing application comprising program instructions for: retrieving live data from the enterprise service, converting the live data to virtualized data by deidentifying personal information, simplifying complex fields, and adjusting date fields, such that the virtualized data is an accurate representation of the live data formatting and is optimized for training purposes, processing the virtualized data using one or more virtualized resources on a host server, wherein the virtualized resources correspond to functions of the enterprise service, and generating a virtualized response to a user request to the host server.

In another embodiment, a method of providing a virtualized training environment to mimic functions of an enterprise service is disclosed. The method may include: retrieving live data from the enterprise service, converting the live data to virtualized data by deidentifying personal information, simplifying complex fields, and adjusting date fields, such that the virtualized data is an accurate representation of the live data formatting and is optimized for training purposes, processing the virtualized data using one or more virtualized resources on a host server, wherein the virtualized resources correspond to functions of the enterprise service, and generating a virtualized response to a user request to the host server.

In another embodiment, a system for providing a virtualized environment to mimic functions of an enterprise service is disclosed. The system may include: a communications interface; a memory coupled to the communications interface, the memory stores an electronic request processing application; and a processor in communication with the memory, the processor executes the electronic request processing application stored in the memory, the electronic request processing application comprising program instructions for: retrieving live data from the enterprise service, converting the live data to virtualized data by replacing one or more entries with duplicate entries, wherein the virtualized data is an accurate representation of the live data formatting, processing the virtualized data using one or more virtualized resources on a host server, wherein the virtualized resources correspond to functions of the enterprise service, and generating a virtualized response to a user request to the host server.

DETAILED DESCRIPTION

Disclosed herein are processor-executable methods, computing systems, and related technologies for using a host server and service virtualization to create a stable training environment for users of a data management system.

The host server and service virtualization provide developers and users access to data and services that may otherwise not be feasible in a live system. Accordingly, applications may be designed and tested earlier in development, allowing for faster discovery of bugs and deficiencies. Trainees may be able to access a stable virtualized training environment that provides consistent and reliable results. Trainers may be able to standardize their training materials and procedures because the virtualized training environment may not be updated as frequently as a live enterprise service.

In addition, embodiments may allow for developers to write code in parallel and without having to wait or create stubs and drivers while enterprise services are being created or enhanced. The application of a host server and service virtualization to the creation of training environments may be described below in more detail with reference to FIGS. 1-11.

Figure 1:
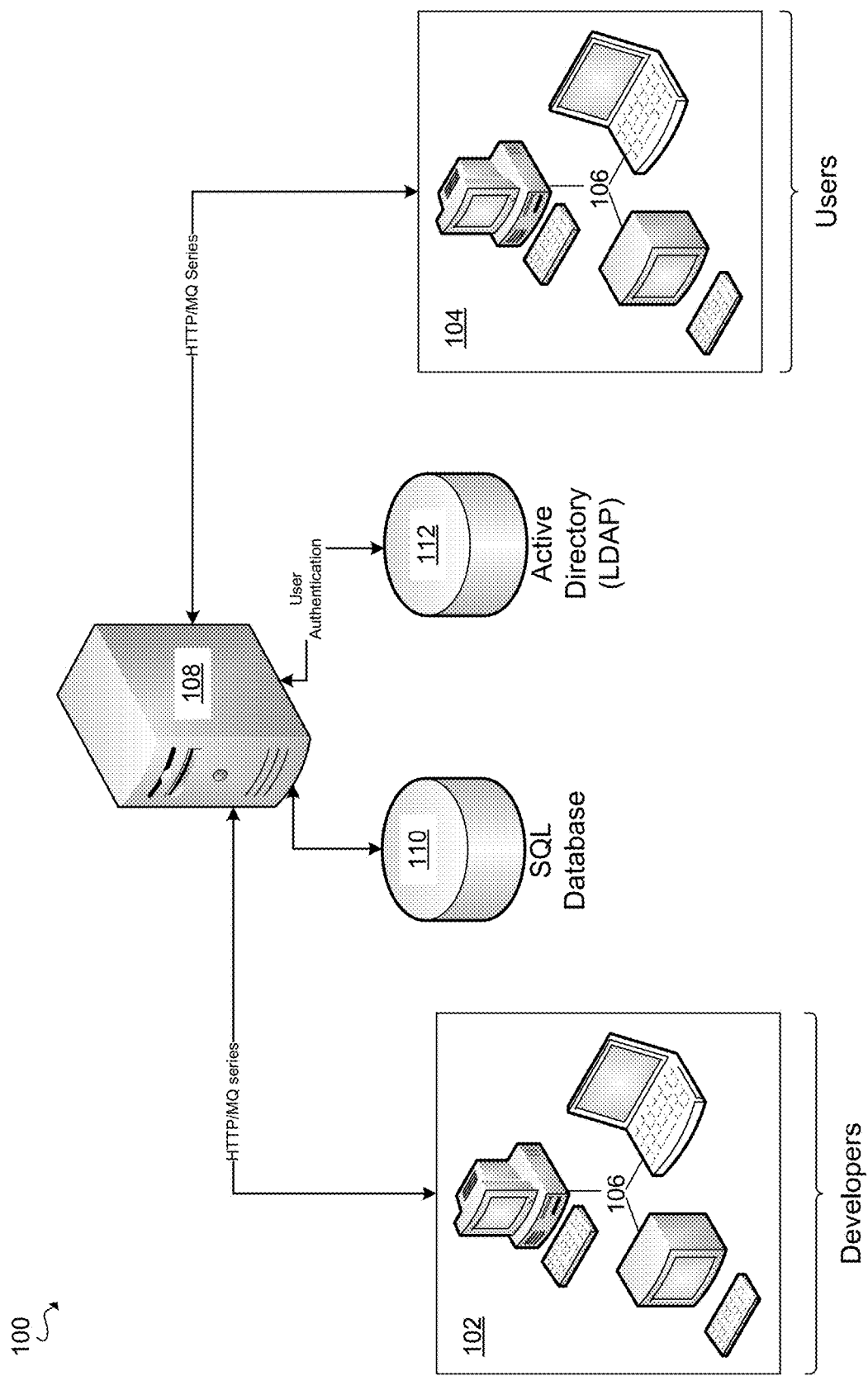
FIG. 1 is a system diagram of a virtual services environment, according to an embodiment.

Referring now to FIG. 1, a system diagram of a virtual services environment 100 is shown. In an embodiment, the virtual services environment 100 may provide a stable training environment for one or more developers 102 (hereinafter "developers") and one or more users 104 (hereinafter "users") using virtualized data taken from a live enterprise service.

In an embodiment, the developers 102 may populate a host server 108 with data that has been pulled from a live enterprise system (not shown) and virtualized for use in training. In an embodiment, the virtualized data may be related to insurance services, such as, for example, insurance claims, client data, and risk management information.

The developers 102 may include one or more clients 106 (hereinafter "clients"). The clients 106 may represent nodes on a TCP/IP network with computational capability and mechanisms for communicating across the network. For example, the clients 106 may correspond to personal computers (PC), laptop computers, tablets, mobile devices, workstations, and/or other electronic computing devices with network connectivity. The developers 102 may communicate with the host server using a conventional protocol, such as, for example, Hypertext Transfer Protocol (HTTP) or message queues (MQs). Although not shown in FIG. 1, the developers 102 may communicate with the live enterprise service in order to obtain live data that may be virtualized and stored on the host server 108.

The users 104 may also include clients 106 and may communicate with the host server 108 using a conventional protocol, such as HTTP or MQ. In an embodiment, the users 104 may be undergoing training to use the live enterprise system. However, instead of accessing the live enterprise system, which may lead to the issues described above, the users 104 are directed to the host server 108 and the virtualized data, which will be described in further detail below with reference to FIGS. 3 and 4.

The host server 108 may manage virtualized data provided by the developers 102 and permit the users 104 to access the virtualized data and virtual services during training. The host server 108 may be a conventional stand-alone web server, a server system, a computing cluster, or any combination thereof. In an embodiment, the host server 108 may include a server, a data warehouse, network, or cloud type storage facility or mechanism that is in communication with the developers 102 and the users 104.

In an embodiment, the host server 108 may be a single server that includes, at least, one or more databases 110 (hereinafter "databases") for storing the virtualized data provided by the developers. In an embodiment, the databases may be a relational database management system managed by Structured Query Language (SQL). In addition, the host server 108 may include a domain controller 112 that authenticates and authorizes the users 104 to access the virtualized data. The domain controller may assign and enforce security policies for all computers, and may be responsible for installing or updating software. In an embodiment, the domain controller 112 may be an Active Directory that makes use of Lightweight Directory Access Protocol (LDAP).

Figure 2:
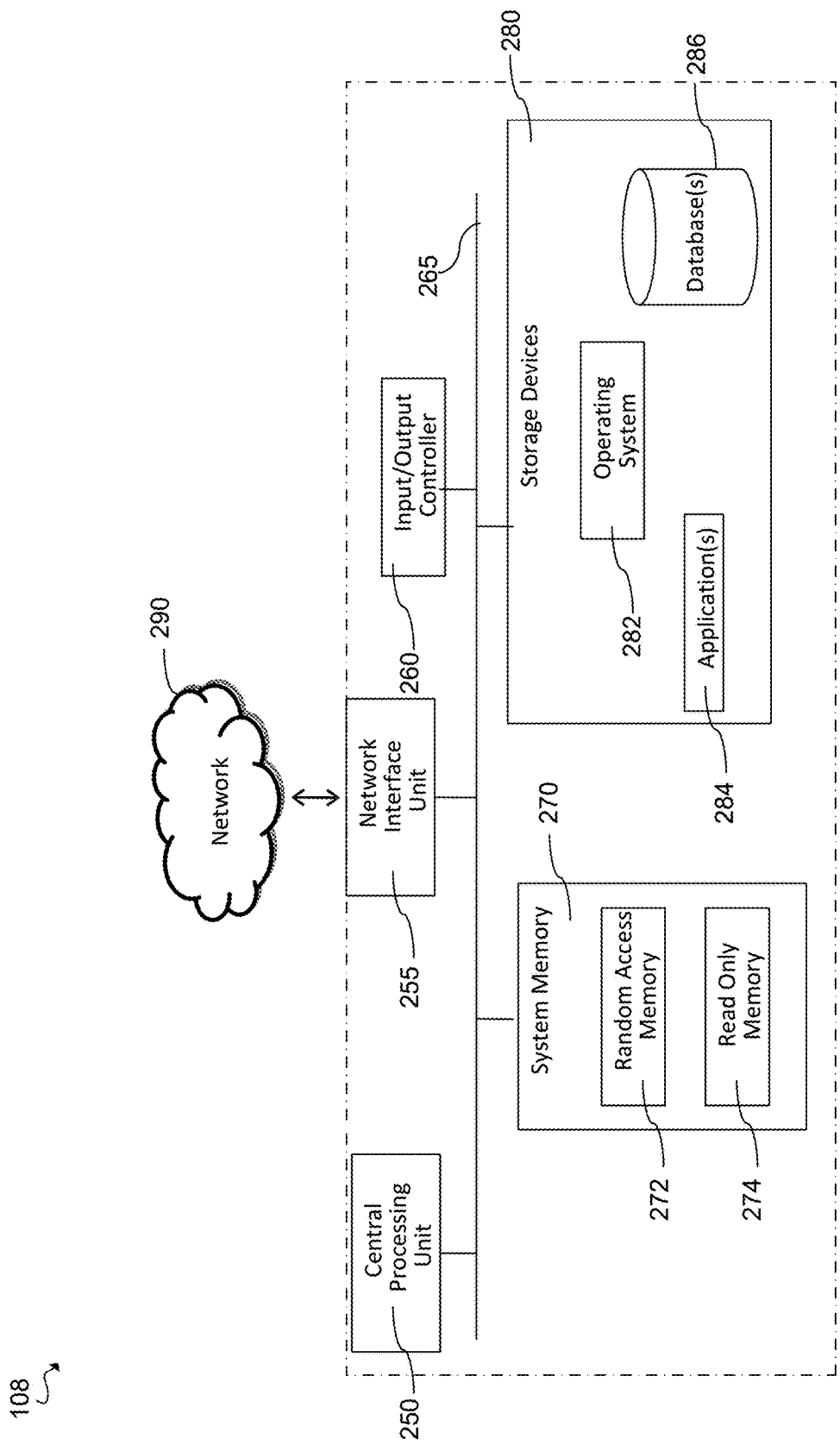
FIG. 2 is a component diagram of the host server, according to an embodiment.

Referring now to FIG. 2, a component diagram of the host server 108 is shown. The host server 108 may include one or more central processing units (CPU) 250, network interface units 255, input/output controllers 260, system memories 270, and storage devices 280. Each CPU 250, network interface unit 255, input/output controller 260, system memory 270, and storage device 280 may be communicatively coupled via bus 265.

The system memory 270 may include random access memory (RAM) 272, read only memory (ROM) 274, and one or more cache. The storage devices 280 may include one or more applications 284, an operating system 282, and one or more databases 286. In an embodiment, the databases 286 may include the databases 110 (FIG. 1). The storage devices 280 may take the form of, but are not limited to, a diskette, hard drive, CD-ROM, thumb drive, hard file, or a Redundant Array of Independent Disks (RAID).

The host server 108 may be accessed by the developers 102 (FIG. 1) and the users 104 (FIG. 1) via a network 290 using a mainframe, thin client, personal computer, mobile device, pad computer, or the like. Information processed by CPU 250 and/or operated upon or stored on storage devices 280 and/or in memory 270 may be displayed to a user through a user device (not shown).

It should be noted that embodiments are not limited to the devices illustrated in FIGS. 1 and 2. Each device may include any number of disparate hardware and/or software elements, some of which may be located remotely from one another. Functions attributed to one device may be performed by one or more other devices. The devices may communicate with one another (and with other non-illustrated elements) over any suitable communication media and protocols that are or become known.

Figure 3:
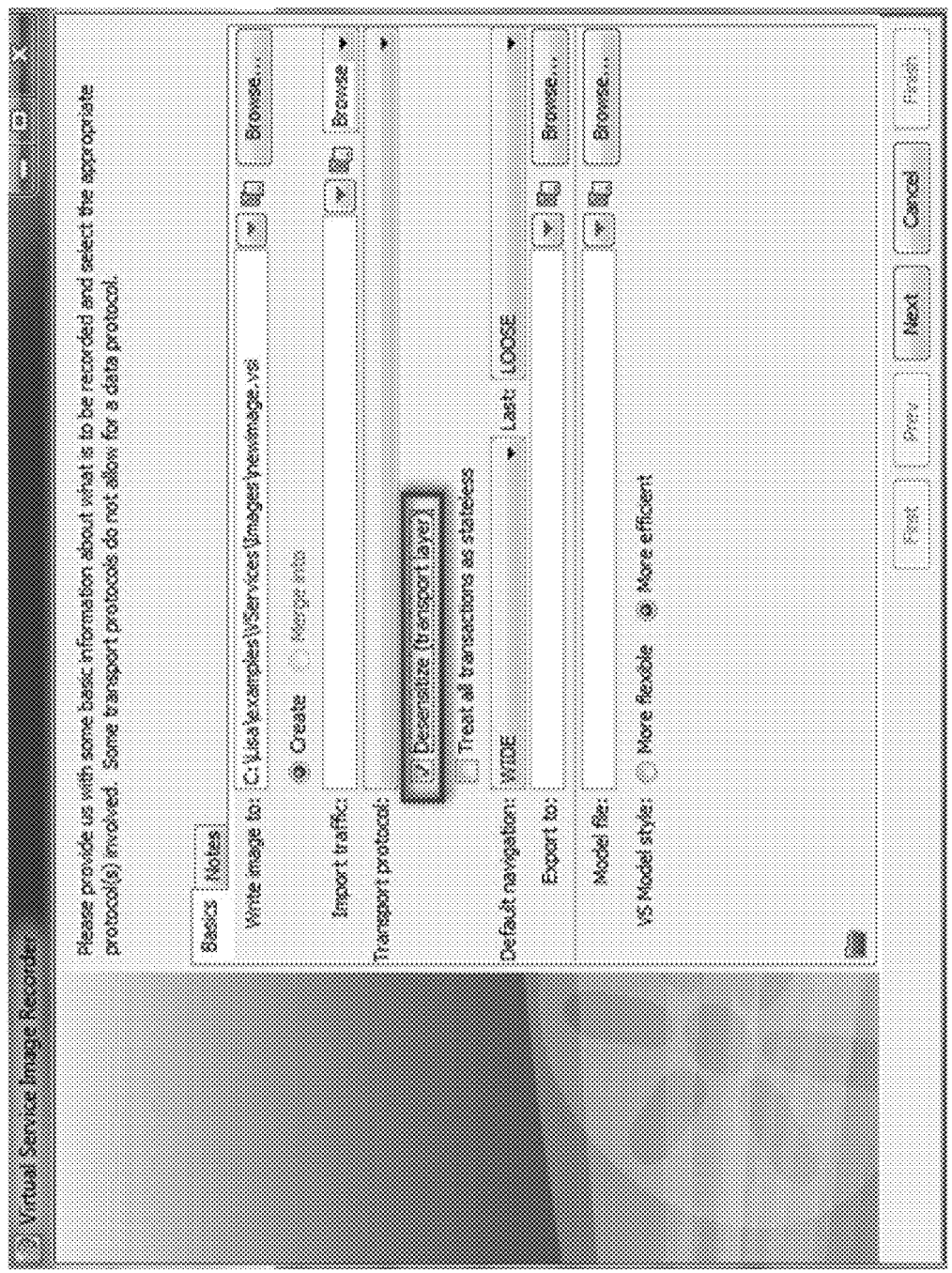
FIG. 3 is a screenshot illustrating the virtualization of live data, according to an embodiment.

Referring now to FIG. 3, a screenshot from the point of view of a developer 102 (FIG. 1) illustrating the virtualization of live data is shown. In an embodiment, the developers 102 may pull live data (or a subset of live data) from the live enterprise system, virtualize it, and upload the virtualized data to the host server 108 (FIG. 1). The virtualized data may a desensitized, simplified, and usable version of the data from the live enterprise system that may be used for a stable training environment.

The desensitized virtualized data may mimic the live data, but may have personal information (e.g., names, addresses, telephone numbers, credit card numbers, Social Security numbers) replaced with randomized realistic substitutes. This may allow the users 104 to use the virtualized data in a realistic way during training without concerns for privacy. The simplified virtualized data may also be similar to the live data, but may have less complex responses in certain fields. The simplified fields may be ones that are not relevant for training purposes. This may enable a user 104 to interact with the virtualized data as if it were the live data for training purposes without complications arising from analyzing larger dataset.

The usable virtualized data may also be similar to the live data, but may have changes made to dates so that the virtualized data does not expire. This may allow the users 104 to access and use the virtualized data well beyond the usable range of the live data. For training purposes, this may provide multiple users 104 with a static and standardized dataset that may be used for extended periods of time.

In order to desensitize, simplify, and edit the live data, a desensitization program may be used. The desensitization program may use volatile filters that help ensure sensitive information is never written to disk during a recording phase. In an embodiment, an Extensible Markup Language (XML) file (desensitize.xml), accessible by the developers 104, may configure data desensitizers to recognize well known patterns in the live data such as credit card numbers and telephone numbers. The desensitization program may then replace the live data with realistic replacements. In an embodiment, the desensitization program may use a regular expression (REGEX) pattern matching algorithm to recognize/find sensitive data. The file containing this data may be parsed each time the recorder is started.

Table 1 illustrates an example of live data before desensitization, by, for example, the desensitization program as described above.

TABLE 1

<CCAddress>
<AddressLine1>200 Hopmeadow Street</AddressLine1>
<AddressType>business</AddressType>
<City>SIMSBURY</City>
<PostalCode>06089</PostalCode>
<State>CT</State>
</CCAddress>

Table 2 illustrates the same live data after it has been desensitized and transformed into virtualized data. It should be noted that the virtualized data contains entries in the <AddressLine1>, <AddressType>, <City>, <PostalCode>, and <State> fields having a similar format but different values. The virtualized data is an accurate representation of the live data that can be used in a training environment.

TABLE 2

<CCAddress>
<AddressLine1>441 Eagle Lane</AddressLine1>
<AddressType>business</AddressType>
<City>Beltsville</City>
<PostalCode>60634</PostalCode>
<State>IN</State>
</CCAddress>

In an embodiment, string generation patterns may be provided as replacement data options. These preset patterns may be customized and the developers 104 may create their own.

In order to provide a stable training environment, the developers 104 may upload/edit/remove the virtualized data from the host server 108 less frequently than the live enterprise system is updated. In an embodiment, the live data may need to be re-virtualized when the live enterprise services change. In another embodiment, the live data may only need to be re-virtualized periodically, for example, every couple of weeks. The frequency of virtualization may depend on how often the trainers want to change the training documentation. In an embodiment, the virtualization may be done automatically.

Figure 4:
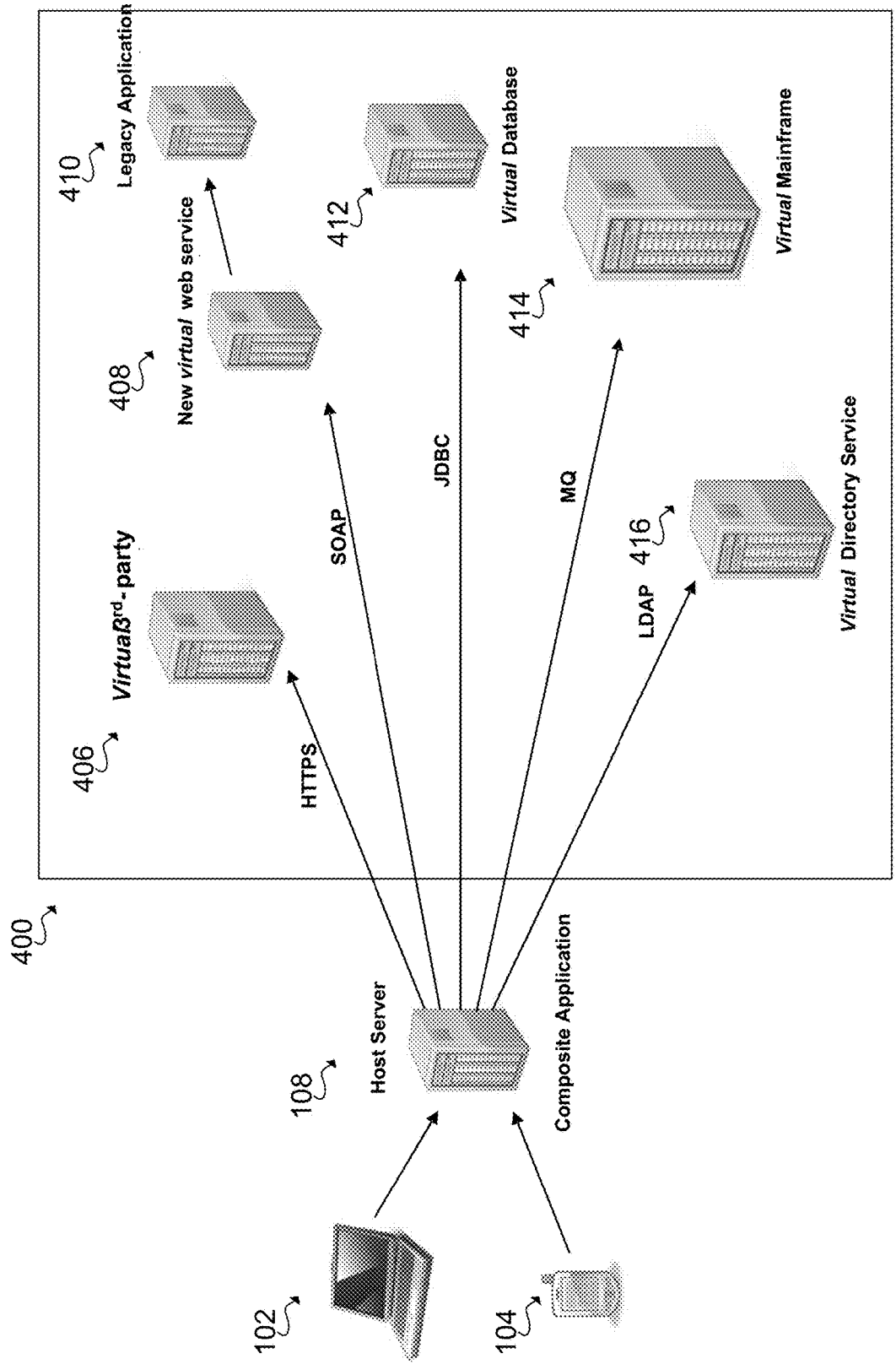
FIG. 4 is a diagram of the host server illustrating examples of virtualized services, according to an embodiment.

Referring now to FIG. 4, a diagram of the host server 108 illustrating examples of virtualized services 400 is shown. As described above, the developers 102 and the users 104 may be connected to the host server 108. Although shown as a computer and mobile device, respectively, the developers 102 and the users 104 may access the system through any type of client 106 (FIG. 1), computer, handheld, mobile, or wearable device.

In an embodiment, the developers 102 and the users 104 may access the virtualized services 400 through a composite application. The composite application may include functionality drawn from several different sources. The components may be individual selected functions from within other applications, or entire systems whose outputs have been packaged as business functions, modules, or web services.

The virtual services 400 may include a number of various functions that may be performed with the virtualized data. For example, the virtual services 400 may include a virtual third party function 406. The virtual third party function 406 may be accessed by, for example, Secure Hypertext Transfer Protocol (HTTPS). The virtual third party function 406 may allow the users 104 to access data during training without transaction fees that may be associated with accessing a live third party resource. In addition, the virtual third party function 406 may provide complete and static data for training purposes.

The virtual services may also include a virtual web service 408. The virtual web service 708 may be accessed by, for example, a Simple Object Access Protocol (SOAP) interface. In an embodiment, the virtual web service 408 may be created by Web Services Description Language (WSDL).

The virtual web service may 408 may emulate one or more web services that the live enterprise system would call. For example, as used in conjunction with insurance claim management software, the virtual web service 408 may emulate functions such as insurance police look-up, insurance policy retrieval, and claim number management. In contrast with the live enterprise service, these functions may all be contained in the one virtual web service 408.

In an embodiment, the virtual web service 408 may communicate with a legacy application 410. In constructing a response to a given request from a user 104, the virtual web service 408 may need to call some other application (e.g., address cleansing) in order to complete the response. For example, the response may require address verification, so the virtual web service 408 would need the external legacy application 418 to "correct" the address with a verified post office address.

The virtual services 400 may also include a virtual database 412. The virtual database 412 may be accessed by, for example, Java database connectivity technology (JDBC). The virtual database 412 may store the virtualized data provided by the developers 102.

The virtual services 400 may also include a virtual mainframe 400. The virtual mainframe 400 may be accessed by, for example, a conventional MQ interface. The virtual mainframe 400 may provide the 24/7 access to the training environment without the downtimes, or million service units (MSU) charges that may be associated with the live enterprise service.

The virtual services 400 may include a virtual directory service 416. The virtual directory service 416 may be accessed by, for example, a Lightweight Directory Access Protocol (LDAP). The virtual directory service 416 may provide access to the virtualized data without the outages and latencies associated with the live enterprise system.

In another embodiment, the host server 108 and virtual services 400 may be used in conjunction with the live enterprise service in order to create a stable training environment. Rather than a self-contained training environment as described above, the host server 108 may be located between the developers 102 and the users 104 in a system under test (SUT) and the live enterprise service. The virtual services 400 on the host server 108 may call upon the virtualized data and provide a virtual response if the live enterprise service is unavailable to generate a response. This may be described below with reference to FIGS. 5-8.

Figure 5:
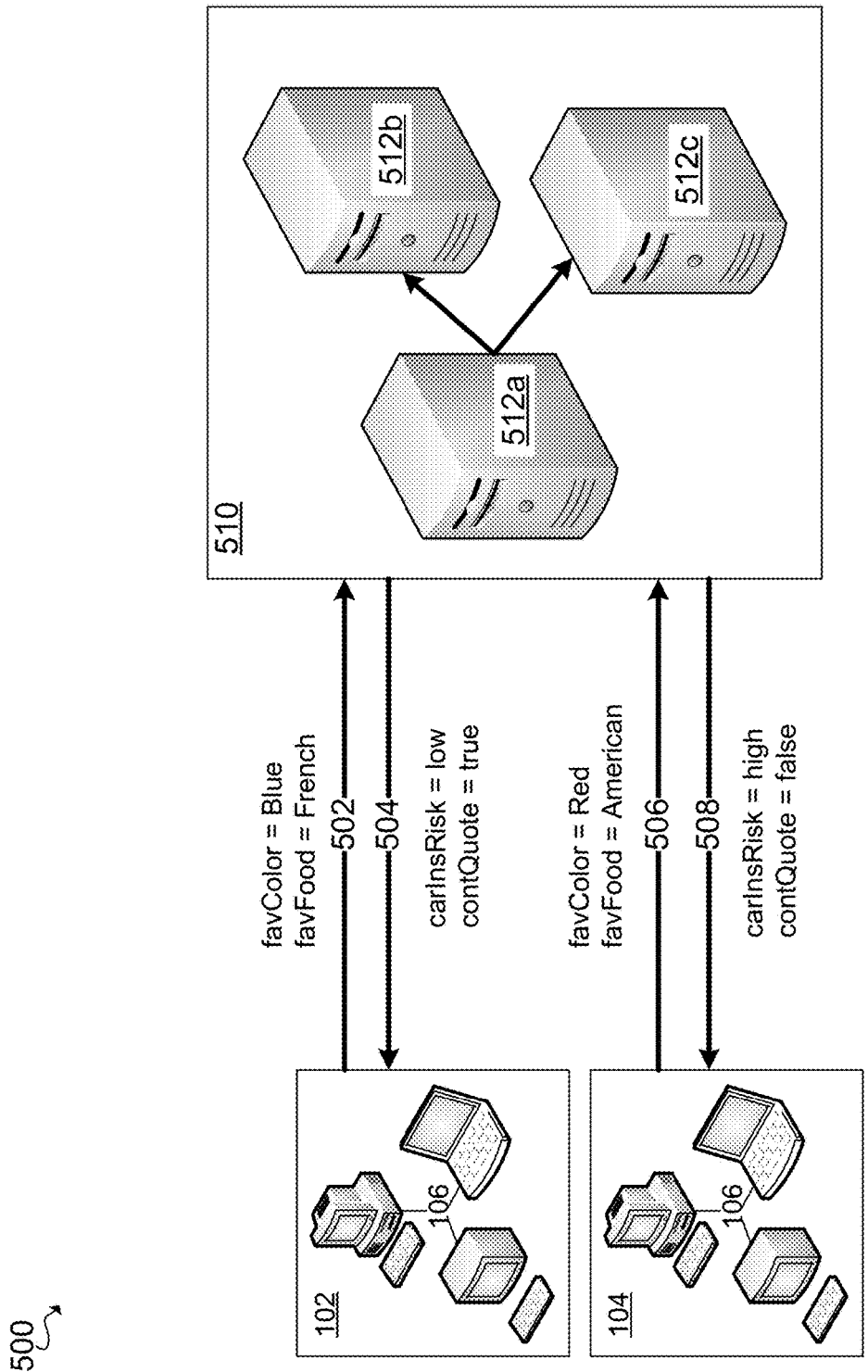
FIG. 5 is a diagram of a system under test (SUT) being performed with a functioning enterprise service, according to an embodiment.

Referring now to FIG. 5, a diagram of an SUT 500 being performed with a live enterprise service 502 is shown. In an embodiment, the SUT 500 may include the developers 102 and the users 104 interacting with the live enterprise service 510. In an embodiment, the live enterprise service 510 may include one or more servers, including, but not limited to, servers 512a, 512b, and 512c. The servers 512a, 512b, and 512c may correspond to nodes that include functionality to service requests from the developers 102 and the users 104. The servers 512a, 512b, and 512c may be computing clusters, or stand-alone servers.

In an embodiment, a server 512a may act as an intermediary for requests from the developers 102 and/or users 104 seeking resources from servers 512b and 512c. In one embodiment, the server 512a may be a load balancer that can process Transmission Control Protocol (TCP) connections and receive Hypertext Transfer Protocol (HTTP) requests. In addition, the server 512a can distribute HTTP requests from the developers 102 and the users 104 among the servers 512b, and 512c.

The live enterprise service 510 may include one or more databases of live data. In an embodiment, the live enterprise system may contain data related to the insurance industry, such as, for example, customer information, claims information, policy information, and risk assessment information.

Under ideal circumstances, the live enterprise service 510 may be configured to accept requests from the developers 102 and the users 104 and provide a response. For example, the developer 102 may send a request 502 to a function of the enterprise service 510, such as a customer psychological profiling service, containing information about a customer, such as "favColor=Blue" and "favFood=French." The live enterprise service 510 may provide a response 504 containing, for example, insurance risk and claim information results about the customer, such as "carInsRisk=low" and "contQuote=true."

Similarly, the user 104, who may be undergoing training, may send a request 506 to the enterprise service 510 containing information about a customer, such as "favColor=Red" and "favFood=American." The enterprise service 510 may provide a response 508 containing results insurance risk and claim information results about the customer, such as "carInsRisk=high" and "contQuote=false."

However, in certain conditions, the live enterprise service 510 may not be a stable environment, and may not even be accessible by the users of the SUT 500. For example, databases in the enterprise services 510 may be constantly added, removed, and updated. This may make it difficult to provide a consistent training environment for users 104. In addition, if the live enterprise service 510 is down or otherwise unable to respond, training may not be able to be conducted because a response 504, 508 may not be able to be generated.

Figure 6:
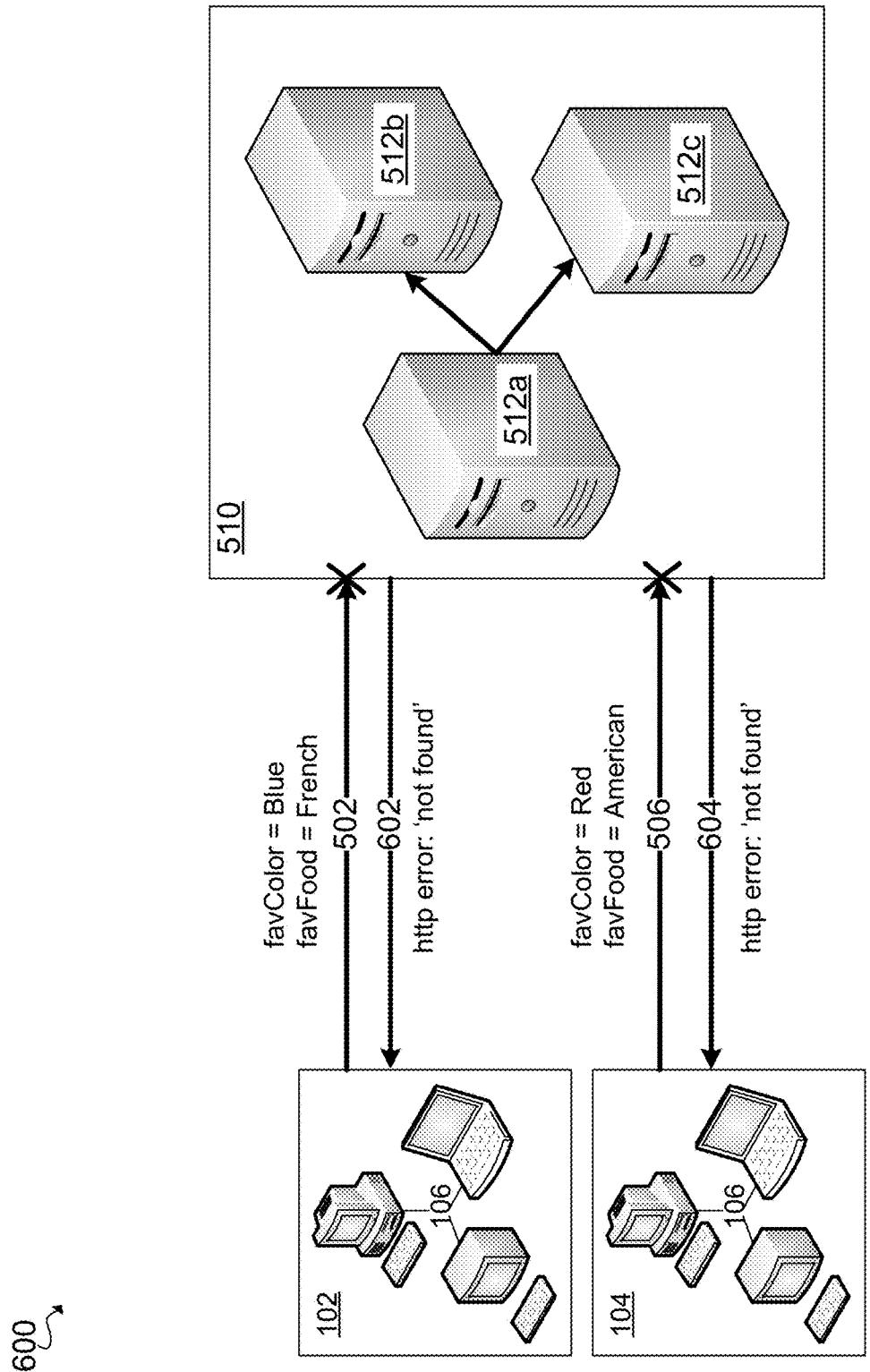
FIG. 6 is a diagram of a SUT being performed with a non-accessible live enterprise service, according to an embodiment.

Referring now to FIG. 6, a diagram of a SUT 600 being performed with a non-accessible enterprise service 510 is shown. The enterprise service 510 may be down or otherwise unavailable to the developers 102 and the users 104. For example, a feature or service requested of the enterprise service 510 may not be available because it has not been written or developed yet. Accordingly, when the developer 102 sends the request 502, an error 602 containing, for example, "http error: 'not found,'" may be returned. In addition, when the user 104 sends the request 506, an error 604 containing, for example, "http error: 'not found,'" may be returned. As discussed above, this may hinder testing and training on the enterprise system 510.

Figure 7:
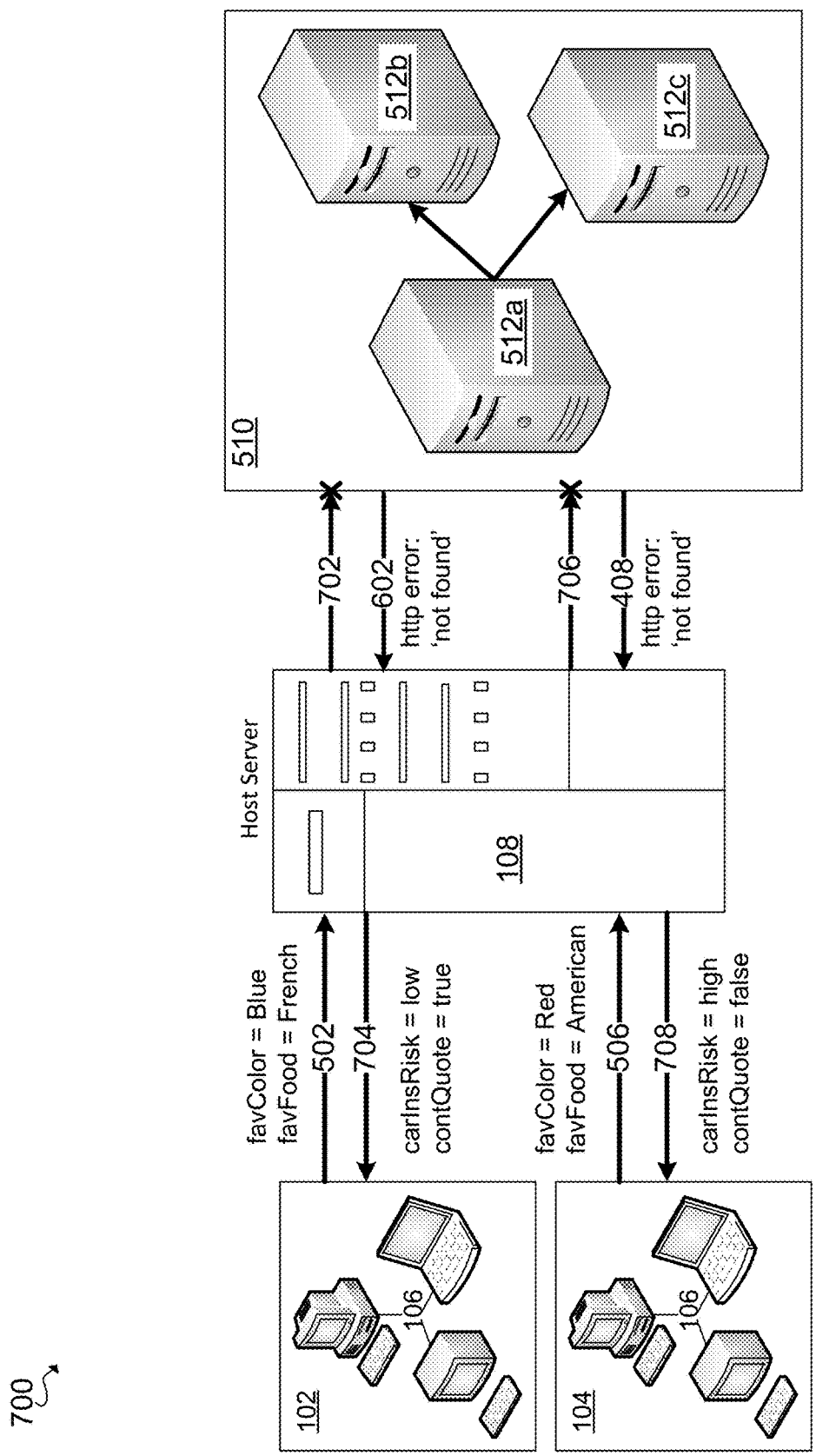
FIG. 7 is a diagram of a SUT being performed with the host server and the non-accessible enterprise service, according to an embodiment.

Referring now to FIG. 7, a diagram of an SUT 700 being performed with the host server 108 and a non-accessible enterprise service 510 is shown. In an embodiment, the host server 108 may act as a layer between the developers 102, the users 104 and the non-accessible enterprise service 510. As described above, the host server 108 may contain virtualized data and the virtualized resources 400 (FIG. 4). The host server 108 may be accessible by the developers 102 and the users 104 regardless of whether or not the live enterprise service 510 is functioning and/or accessible.

For example, the developer 102 may send the request 502 as described above with reference to FIG. 5, but instead of going directly to the live enterprise service 510, the request 502 may be first sent to the host server 108. The host server 108 may send a new request 702 to the live enterprise service 510 that is identical to the request 502 (e.g., "favColor=Blue" and "favFood=French"). If the live enterprise service 510 is unavailable, the host server 108 may receive the error 602. In another embodiment, the host server 108 may wait for a timeout for a response from the live enterprise service 510, and proceed as below if a response is not received.

Upon receiving the error 602, or timeout, the host server 108 may access the virtual resources 400 (FIG. 4), and may generate a virtualized response 704 using the virtualized data. In an embodiment, the virtualized response 704 may be generated automatically if the host server 108 receives the error 602, or timeout, from the live enterprise service 510. In another embodiment, the host server 108 may have an admin mode where the endpoint (i.e., the live enterprise system 510 or the virtual resources 400) can be manually selected for all future requests/responses going forward. The host server 108 may send the virtualized response 704 to the developer 102. In an embodiment, the virtualized response 704 may contain information that corresponds to the live data in the live enterprise service 510 (e.g., "carInsRisk=low" and "contQuote=true"). The virtualized response may enable the developer to test new functionality independent of the live enterprise system 510.

Similarly, the user 104 may send the request 506 as described above with reference to FIG. 5, but instead of going directly to the live enterprise service 510, the request 506 may be first sent to the host server 108. The host server 108 may send a new request 706 to the live enterprise service 510 that is identical to the request 506 (e.g., "favColor=Red" and "favFood=American"). If the live enterprise service 510 is unavailable, the host server 108 may receive the error 604. In another embodiment, the host server 108 may wait for a timeout for a response from the live enterprise service 510, and proceed as below if a response is not received.

Upon receiving the error 604, or timeout, the host server 108 may access the virtual resources 400 (FIG. 4), and may generate a virtualized response 708 using the virtualized data. In an embodiment, the virtualized response 708 may be generated automatically if the host server 108 receives the error 706, or timeout, from the live enterprise service 510. In another embodiment, the host server 108 may have an admin mode where the endpoint (i.e., the live enterprise system 510 or the virtual resources 400) can be manually selected for all future requests/responses going forward. The host server 108 may send the virtualized response 708 to the user 104. In an embodiment, the virtualized response 404 may contain information that corresponds to the live data in the live enterprise service 510 (e.g., "carInsRisk=high" and "contQuote=false").

With the host server 108 providing usable virtualized responses, the developers 102 and the users 104 may not need to contend with an unavailable live enterprise service 510. Regardless of the state the live enterprise service 510, the developers 102 and the testers 104 may receive a valid response without knowing if the enterprise service is up or down.

Figure 8:
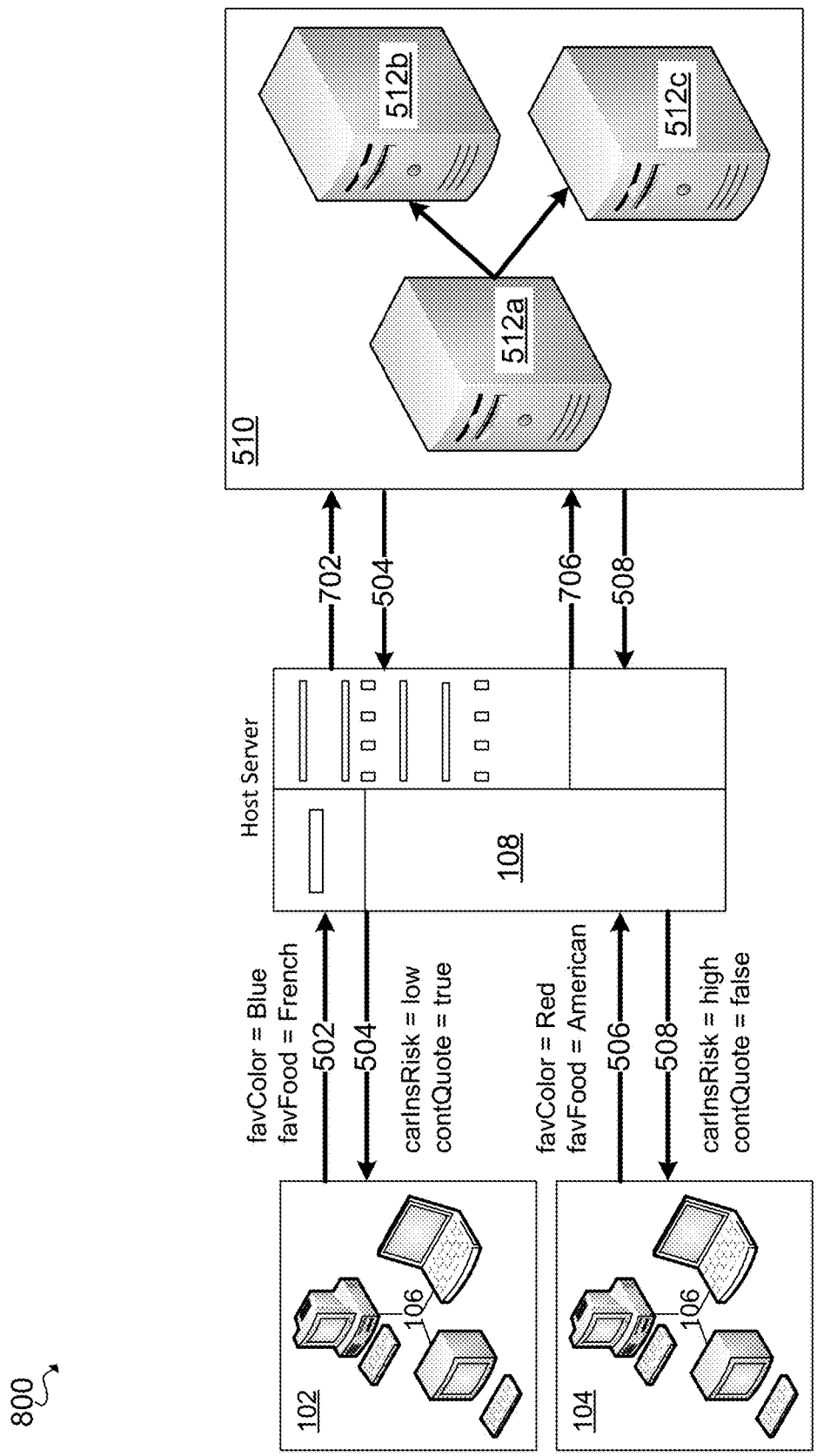
FIG. 8 is a diagram of a SUT being performed with the host server and the functioning live enterprise service, according to an embodiment.

Referring now to FIG. 8, a diagram of a SUT 800 being performed with the host server 108 and a functioning enterprise service 510 is shown. Similar to the embodiment described above with reference to FIG. 7, the host server 108 may be a layer located between the developers 102, the users 104, and the live enterprise service 510. As described above, the host server 108 may contain virtualized data and the virtualized resources 400 (FIG. 4). The host server 108 may be accessible by the developers 102 and the users 104 regardless of whether or not the live enterprise service 510 is functioning and/or accessible.

The developer 102 may send the request 502 as described above with reference to FIG. 5, but instead of going directly to the live enterprise service 510, the request 502 may be first sent to the host server 108. The host server 108 may send the new request 702 to the live enterprise service 510. In an embodiment the new request 702 may be identical to the request 502 (e.g., "favColor=Blue" and "favFood=French"). Because the enterprise service 510 may be functioning and available, it may receive the new request 702 and return the response 504 (e.g., "carInsRisk=low" and "contQuote=true"). Upon receiving the response 504, the host server 108 may forward it on to the developer 102.

Similarly, the user 104 may send the request 506 as described above with reference to FIG. 5, but instead of going directly to the live enterprise service 510, the request 506 may be first sent to the host server 108. The host server 108 may send the new request 706 to the enterprise service 510. In an embodiment, the new request 706 may be identical to the request 506 (e.g., "favColor=Red" and "favFood=American"). Because the enterprise service 510 may be functioning and available, it may receive the new request 706 and return the response 508 (e.g., "carInsRisk=high" and "contQuote=false"). Upon receiving the response 508, the host server 108 may forward it on to the user 104.

Figure 9:
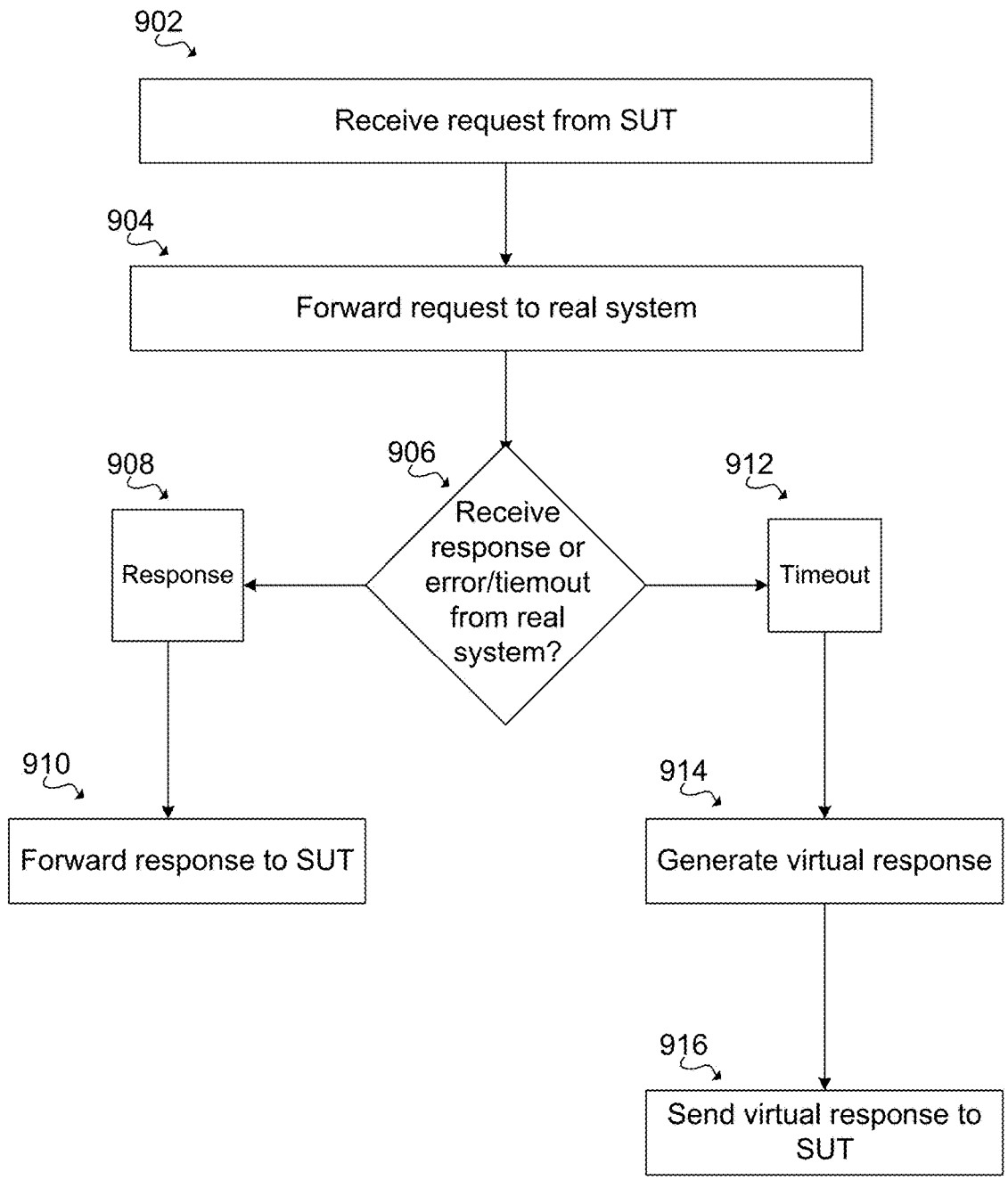
FIG. 9 is a flowchart illustrating a method of using virtual services in conjunction with a live enterprise service to provide a stable training environment, according to an embodiment.

Referring now to FIG. 9, a flowchart illustrating a method of using the host server and service virtualization in conjunction with the live enterprise service to provide a stable training environment is shown. In step 902, the host server may be configured to accept a request from developers/users in the SUT. In step 904, the host server may forward the request on to the enterprise service. In step 906, the host server may determine if the enterprise service provides a response or a timeout/error. If the enterprise service is active and responds to the request, step 908, the host server may pass the response on to the users in the SUT in step 910.

If the enterprise service is not active and the host server receives an error/time out, step 912, the host server may generate a virtualized response in step 914. In step 916, the host server may forward the virtualized response to the users in the SUT.

In an embodiment, the interactions with the host server may be transparent to the users in the SUT. The host server may allow for the SUT to be independent from application and service updates in the enterprise service. This may be beneficial for the development and testing of applications and services, as well as training on them. Using the host server to lock in a version of the application with a version of the services may allow trainees to continue their work uninterrupted and learn the system in a static environment. As the application and services change, the virtualized data on the host server may be updated as well, but may be done on a predetermined, and likely less frequent, schedule as described above with reference to FIG. 3.

As used herein, devices may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 10:
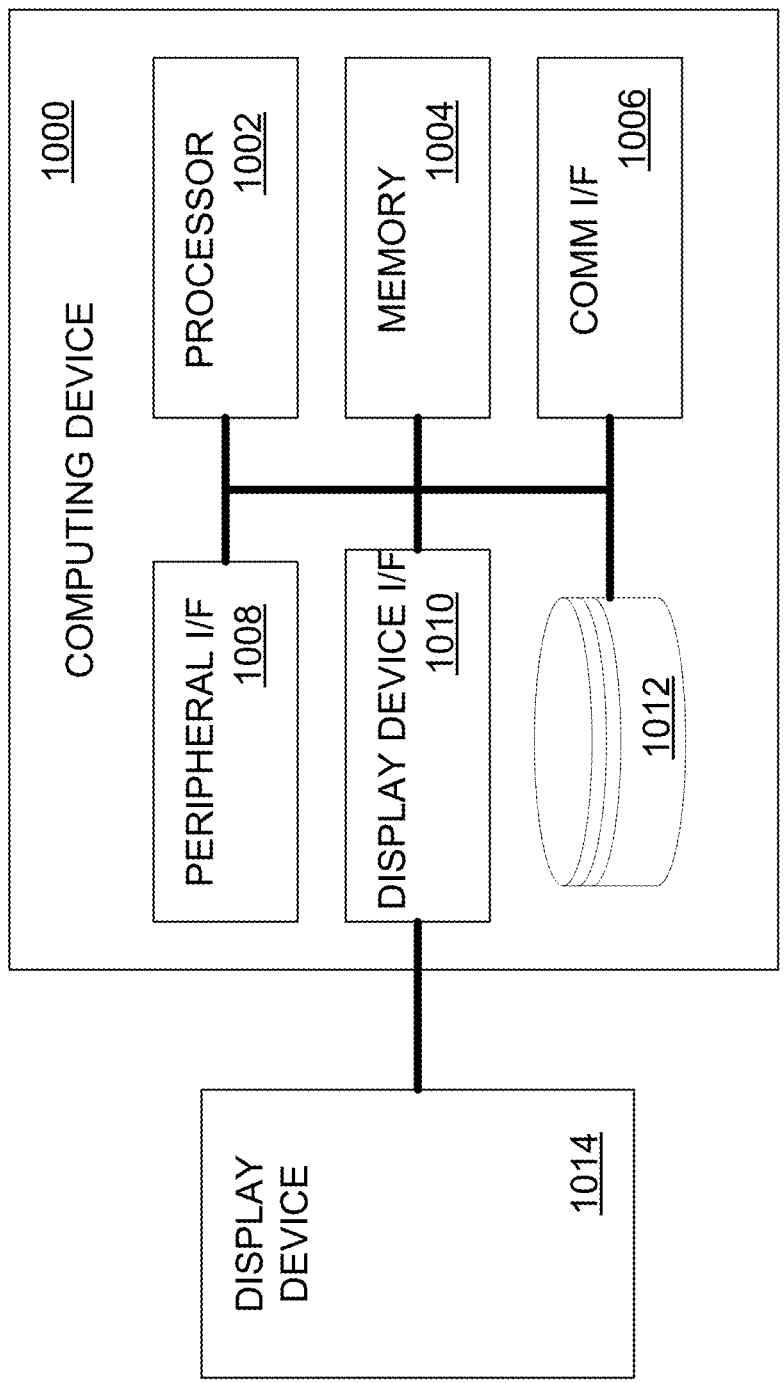
FIG. 10 is an example computing device that may be used to implement features of the host server, according to an embodiment.

Referring now to FIG. 10, an example computing device 1000 that may be used to implement features of the host server described above is shown. In an embodiment, the computing device 1000 may be implemented in the clients 106 (FIG. 1). The computing device 1000 may include a processor 1002, a memory device 1004, a communication interface 1006, a peripheral device interface 1008, a display device interface 1010, and a storage device 1012. FIG. 10 also shows a display device 1014, which may be coupled to or included within the computing device 1000.

The memory device 1004 may be or include a device such as a Dynamic Random Access Memory (D-RAM), Static RAM (S-RAM), or other RAM or a flash memory. The storage device 1012 may be or include a hard disk, a magneto-optical medium, an optical medium such as a CD-ROM, a digital versatile disk (DVDs), or Blu-Ray disc (BD), or other type of device for electronic data storage.

The communication interface 1006 may be, for example, a communications port, a wired transceiver, a wireless transceiver, and/or a network card. The communication interface 1006 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 1008 may be an interface configured to communicate with one or more peripheral devices. The peripheral device interface 1008 may operate using a technology such as Universal Serial Bus (USB), PS/2, Bluetooth, infrared, serial port, parallel port, and/or other appropriate technology. The peripheral device interface 1008 may, for example, receive input data from an input device such as a keyboard, a mouse, a trackball, a touch screen, a touch pad, a stylus pad, and/or other device. Alternatively or additionally, the peripheral device interface 1008 may communicate output data to a printer that is attached to the computing device 1000 via the peripheral device interface 1008.

The display device interface 1010 may be an interface configured to communicate data to display device 1014. The display device 1014 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 1010 may operate using technology such as Video Graphics Array (VGA), Super VGA (S-VGA), Digital Visual Interface (DVI), High-Definition Multimedia Interface (HDMI), or other appropriate technology. The display device interface 1010 may communicate display data from the processor 1002 to the display device 1014 for display by the display device 1014. As shown in FIG. 10, the display device 1014 may be external to the computing device 1000, and coupled to the computing device 1000 via the display device interface 1010. Alternatively, the display device 1014 may be included in the computing device 1000.

An instance of the computing device 1000 of FIG. 10 may be configured to perform any feature or any combination of features described above. In such an instance, the memory device 1004 and/or the storage device 1012 may store instructions which, when executed by the processor 1002, cause the processor 1002 to perform any feature or any combination of features described above. Alternatively or additionally, in such an instance, each or any of the features described above may be performed by the processor 1002 in conjunction with the memory device 1004, communication interface 1006, peripheral device interface 1008, display device interface 1010, and/or storage device 1012.

Although FIG. 10 shows that the computing device 1000 includes a single processor 1002, single memory device 1004, single communication interface 1006, single peripheral device interface 1008, single display device interface 1010, and single storage device 1012, the computing device may include multiples of each or any combination of these components 1002, 1004, 1006, 1008, 1010, 1012, and may be configured to perform, mutatis mutandis, analogous functionality to that described above.

Figure 11:
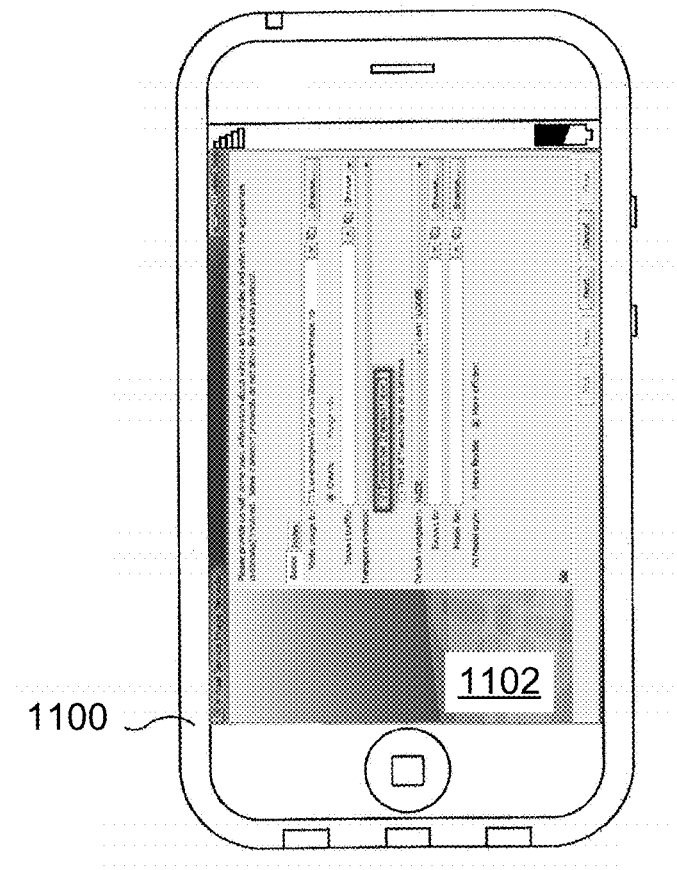
FIG. 11 is a tablet computer that is a more specific example of the computing device of FIG. 10, according to an embodiment.

FIG. 11 shows a mobile device 1100 that is an example of the computing device 1000 of FIG. 10. The mobile device 1100 may include a processor (not depicted), memory device (not depicted), communication interface (not depicted), peripheral device interface (not depicted), display device interface (not depicted), storage device (not depicted), and touch screen display 1102, which may possess characteristics of the processor 1002, memory device 1004, communication interface 1006, peripheral device interface 1008, display device interface 1010, storage device 1012, and display device 1014, respectively, as described above with reference to FIG. 10. The touch screen display 1102 may receive user input using technology such as, for example, resistive sensing technology, capacitive sensing technology, optical sensing technology, or any other appropriate touch-sensing technology. As shown in FIG. 11, the touch screen display 1102 may display a console running the host server as described above with reference to FIGS. 1-9. The touch screen display 1102 may receive input, for example from a developer for virtualizing live data, as shown in the touch screen display 1102.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

The host server and virtual services described above may provide many advantages in a training environment. For example, a trainee may always receive the same response for a given request regardless of updates to the live enterprises system. In addition, the virtualized data may be desensitized, simplified, and edited to be usable over a longer time period. This may provide consistency not only for a single trainee, but among multiple trainees. In addition, the host server may function independently of an enterprise service that may go off-line for maintenance, or may be constantly updated. Because of the availability of the host server, training schedules may be easier to adhere to.

The embodiments described herein are solely for the purpose of illustration. Those in the art will recognize that other embodiments may be practiced with modifications and alterations limited only by the claims. For example, though the methods and features described above with reference to FIG. 1-11 are described above as performed using the exemplary system 100 of FIG. 1 and using the exemplary components of FIG. 4, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-11 may be used alone without the other features and elements or in various combinations with or without other features and elements. Sub-elements of the methods and features described above with reference to FIGS. 1-11 may be performed in any arbitrary order (including concurrently), in any combination or sub-combination.

What is claimed is:

1. A system for providing a virtualized training environment to mimic functions of an enterprise service, the system comprising:
   a communications interface;
   a memory coupled to the communications interface, the memory stores an electronic request processing application; and
   a processor in communication with the memory, the processor executes the electronic request processing application stored in the memory, the electronic request processing application comprising program instructions for:
   retrieving live data from the enterprise service,
   converting the live data to virtualized data by deidentifying personal information, simplifying complex fields, and adjusting date fields, wherein the virtualized data is an accurate representation of the live data formatting and is optimized for training purposes, the deidentifying personal information occurring by examining live data using a regular expression pattern matching algorithm and replacing recognized data with realistic replacements that mimic the live data without personal information;
   processing the virtualized data using one or more virtualized resources on a host server, wherein the virtualized resources correspond to functions of the enterprise service and provide a stable training environment to match training documentation, wherein the stable training environment is provided by modifying the virtualized data from the host server less frequently than live data; and generating a virtualized response to a user request to the host server, the user request interacting with at least one of a virtual web service accessed via Simple Object Access Protocol, a virtual third party accessed with Hypertext Transfer Protocol, a virtual database accessed via Java database connectivity technology, a virtual mainframe accessed via a conventional MQ interface, and a virtual directory service accessed via Lightweight Directory Access Protocol.

2. The system of claim 1, wherein the retrieving live data from the enterprise service is performed periodically, wherein the retrieving live data is independent from updates to the enterprise service.

3. The system of claim 1, wherein the live data comprises customer information, claims information, policy information, and risk assessment information.

4. The system of claim 1, wherein the deidentifying personal information comprises replacing names, addresses, telephone numbers, credit card numbers, and Social Security numbers in the live data with randomized realistic substitutes.

5. The system of claim 1, wherein the retrieving live data from the enterprise service is performed periodically, wherein the retrieving live data is independent from updates to the enterprise service.

6. The system of claim 1, further comprising a desensitization program, executable by the processor, configured to convert the live data to the virtualized data.

7. The system of claim 6, wherein the desensitization program comprises volatile filters to ensure sensitive information from the live data is not written to disk during a recording phase.

8. The system of claim 6, wherein the desensitization program comprises an Extensible Markup Language (XML) file to configure a data desensitizer to recognize well known patterns of personal information in the live data.

9. The system of claim 1, wherein the virtualized resources comprise a virtual third party function, a virtual web service, a virtual database, a virtual mainframe, and a virtual directory service.

10. A method of providing a virtualized training environment to mimic functions of an enterprise service, the method comprising:
retrieving live data from the enterprise service,
converting the live data to virtualized data by deidentifying personal information, simplifying complex fields, and adjusting date fields, wherein the virtualized data is an accurate representation of the live data formatting and is optimized for training purposes, the deidentifying personal information occurring by examining live data using a regular expression pattern matching algorithm and replacing recognized data with realistic replacements that mimic the live data without personal information,
processing the virtualized data using one or more virtualized resources on a host server, wherein the virtualized resources correspond to functions of the enterprise service and provide a stable training environment to match training documentation wherein the stable training environment is provided by modifying the virtualized data from the host server less frequently than live data; and
generating a virtualized response to a user request to the host server, the user request interacting with at least one of a virtual web service accessed via Simple Object Access Protocol, a virtual third party accessed with Hypertext Transfer Protocol, a virtual database accessed via Java database connectivity technology, a virtual mainframe accessed via a conventional MQ interface, and a virtual directory service accessed via Lightweight Directory Access Protocol.

11. The method of claim 10, wherein the retrieving live data from the enterprise service is performed periodically, wherein the retrieving live data is independent from updates to the enterprise service.

12. The method of claim 10, wherein the live data comprises customer information, claims information, policy information, and risk assessment information.

13. The method of claim 10, wherein the deidentifying personal information comprises replacing names, addresses, telephone numbers, credit card numbers, and Social Security numbers in the live data with randomized realistic substitutes.

14. The method of claim 10, wherein the adjusting date fields comprises modifying date entries in the live data wherein the virtualized data does not expire during training.

15. The method of claim 10, wherein the deidentifying personal information comprises using volatile filters to ensure sensitive information from the live data is not written to disk during a recording phase.

16. The method of claim 10, wherein the deidentifying personal information comprises using an Extensible Markup Language (XML) file to configure a data desensitizer to recognize well known patterns of personal information in the live data.

17. The method of claim 10, wherein the virtualized resources comprise a virtual third party function, a virtual web service, a virtual database, a virtual mainframe, and a virtual directory service.

18. A system for providing a virtualized environment to mimic functions of an enterprise service, the system comprising:
a communications interface;
a memory coupled to the communications interface, the memory stores an electronic request processing application; and
a processor in communication with the memory, the processor executes the electronic request processing application stored in the memory, the electronic request processing application comprising program instructions for:
retrieving live data from the enterprise service,
converting the live data to virtualized data by replacing one or more entries with duplicate entries, wherein the virtualized data is an accurate representation of the live data formatting, wherein the converting the live data to virtualized data comprises deidentifying personal information, simplifying complex fields, and adjusting date fields, the deidentifying personal information occurring by examining live data using a regular expression pattern matching algorithm and replacing recognized data with realistic replacements that mimic the live data without personal information;
processing the virtualized data using one or more virtualized resources on a host server, wherein the virtualized resources correspond to functions of the enterprise service and provide a stable training environment to match training documentation, wherein the stable training environment is provided by modifying the virtualized data from the host server less frequently than live data; and
generating a virtualized response to a user request to the host server, the user request interacting with at least one of a virtual web service accessed via Simple Object Access Protocol, a virtual third party accessed with Hypertext Transfer Protocol, a virtual database accessed via Java database connectivity technology, a virtual mainframe accessed via a conventional MQ interface, and a virtual directory service accessed via Lightweight Directory Access Protocol.

19. The system of claim 18, wherein the retrieving live data from the enterprise service is performed periodically, wherein the retrieving live data is independent from updates to the enterprise service.

* * * * *